US011084120B2

(12) United States Patent
Facemyer (10) Patent No.: US 11,084,120 B2
(45) Date of Patent: Aug. 10, 2021

(54) METHOD AND APPARATUS TO MONITOR A FIRE STATE ASSOCIATED WITH A WELDING EVENT

(71) Applicant: Stellar Group, Inc., Jacksonville, FL (US)

(72) Inventor: Luke T. Facemyer, St. Johns, FL (US)

(73) Assignee: Stellar Group, Inc., Jacksonville, FL (US)

( * ) Notice: Subject to any disclaimer, the term of this patent is extended or adjusted under 35 U.S.C. 154(b) by 0 days.

(21) Appl. No.: 16/690,584

(22) Filed: Nov. 21, 2019

(65) Prior Publication Data

US 2021/0154763 A1 May 27, 2021

(51) Int. Cl.
| | | |
|---|---|---|
| *G08B 17/00* | (2006.01) | |
| *B23K 11/25* | (2006.01) | |
| *A62C 37/36* | (2006.01) | |
| *G06K 9/00* | (2006.01) | |
| *B23K 9/10* | (2006.01) | |

(52) U.S. Cl.
CPC .......... *B23K 11/252* (2013.01); *A62C 37/36* (2013.01); *B23K 9/1062* (2013.01); *G06K 9/00711* (2013.01); *G08B 17/00* (2013.01)

(58) Field of Classification Search
None
See application file for complete search history.

(56) References Cited

U.S. PATENT DOCUMENTS

| | | | | |
|---|---|---|---|---|
| 2008/0036593 | A1* | 2/2008 | Rose-Pehrsson | G08B 25/00 340/540 |
| 2009/0045937 | A1* | 2/2009 | Zimmerman | G08B 17/00 340/506 |
| 2015/0352655 | A1* | 12/2015 | Watters | B23K 9/0953 700/282 |
| 2016/0350096 | A1* | 12/2016 | Pipilas | G06F 8/65 |
| 2018/0174417 | A1* | 6/2018 | Yin | G08B 29/18 |

* cited by examiner

*Primary Examiner* — John F Mortell
(74) *Attorney, Agent, or Firm* — Rogers Towers, P.A.; Joseph P. Kincart (57) ABSTRACT

The present invention relates to methods and apparatus for detection of fire states in the presence of welding activities. In some examples, the welding detection system may algorithmically calculate a risk of a fire state developing. In some embodiments, the welding fire detection and prevention system may communicate warning states to users, supervisors, equipment and/or building monitoring systems.

20 Claims, 8 Drawing Sheets

```
┌─────────────────────────────────────────────────────────────┐
│     INSTALL INFRARED CAMERAS/SENSORS UPON STRUCTURE IN A    │
│ 500     LOCATION WHERE WELDING IS PERFORMED                 │
└─────────────────────────────────────────────────────────────┘
                              │
┌─────────────────────────────────────────────────────────────┐
│    OPTIONALLY TRAIN FIRE DETECTION AND PREVENTION SYSTEM BY │
│ 501    USING THE WELDING EQUIPMENT IN STANDARD MANNERS      │
└─────────────────────────────────────────────────────────────┘
                              │
┌─────────────────────────────────────────────────────────────┐
│ 502            INITIATE A WELDING PROCESS                   │
└─────────────────────────────────────────────────────────────┘
                              │
┌─────────────────────────────────────────────────────────────┐
│   MONITOR THE AREA AND WELDING LOCATION FOR HEATING AND STATE│
│            OF FIRE WITH INFRARED CAMERAS/SENSORS            │
│ 503                                                         │
└─────────────────────────────────────────────────────────────┘
                              │
┌─────────────────────────────────────────────────────────────┐
│        OPTIONALLY MONITOR THE WELDING PROCESS ITSELF        │
│ 504                                                         │
└─────────────────────────────────────────────────────────────┘
                              │
┌─────────────────────────────────────────────────────────────┐
│   OPTIONALLY USE IR OR VISIBLE SPECTRUM CAMERAS TO REVIEW   │
│   MATERIALS IN THE PRESENCE OF WELDING, SPARKS, FLAMES ETC… │
│ 505                                                         │
└─────────────────────────────────────────────────────────────┘
                              │
┌─────────────────────────────────────────────────────────────┐
│     DETECT A FIRE STATE OR RISK OF A DEVELOPING FIRE STATE  │
│ 506                                                         │
└─────────────────────────────────────────────────────────────┘
                              │
┌─────────────────────────────────────────────────────────────┐
│  COMMUNICATE ALARM STATE WITH ONE OR MORE OF VISUAL OR      │
│   AUDIBLE ALARMS, TEXTUAL COMMUNICATIONS, OR CONTROL        │
│    SIGNALS TO WELDING AND FIRE SUPPRESSING EQUIPMENT        │
│ 507                                                         │
└─────────────────────────────────────────────────────────────┘
```

```
┌─────────────────────────────────────────────────────────────┐
│      DEFINE A FIRE STATE AREA PROXIMATE TO A WELDING EVENT   │
│ 800                                                           │
└─────────────────────────────────────────────────────────────┘

┌─────────────────────────────────────────────────────────────┐
│ SECURE A SENSOR IN A POSITION ENABLING THE SENSOR TO DETECT A│
│   PHYSICAL CONDITION OF AN ARTICLE WITHIN THE FIRE STATE AREA│
│ 801                                                           │
└─────────────────────────────────────────────────────────────┘

┌─────────────────────────────────────────────────────────────┐
│       PLACE THE SENSOR IN LOGICAL COMMUNICATION WITH A FIRE  │
│ 802                      MONITOR CONTROLLER                   │
└─────────────────────────────────────────────────────────────┘

┌─────────────────────────────────────────────────────────────┐
│    GENERATE FIRST SENSOR OUTPUT VALUES FROM THE SENSOR;      │
│   TRANSMIT SAME TO THE FIRE MONITOR CONTROLLER TO GENERATE   │
│ 803              PRE-EXISTING STATE SIGNATURE                │
└─────────────────────────────────────────────────────────────┘

┌─────────────────────────────────────────────────────────────┐
│ 804                PERFORM THE WELDING PROCESS                │
└─────────────────────────────────────────────────────────────┘

┌─────────────────────────────────────────────────────────────┐
│   GENERATE SECOND SENSOR OUTPUT VALUES FROM THE SENSOR;      │
│   TRANSMIT SAME TO THE FIRE MONITOR CONTROLLER TO GENERATE   │
│              POST-WELDING EVENT STATE SIGNATURE              │
│ 805                                                           │
└─────────────────────────────────────────────────────────────┘

┌─────────────────────────────────────────────────────────────┐
│    COMPARE THE PRE-EXISTING STATE SIGNATURE WITH THE POST-   │
│                WELDING EVENT STATE SIGNATURE                  │
│ 806                                                           │
└─────────────────────────────────────────────────────────────┘

┌─────────────────────────────────────────────────────────────┐
│    DESIGNATE A RANGE OF VALUES THAT COMPRISE ALARM STATE     │
│                            VALUES                             │
│ 807                                                           │
└─────────────────────────────────────────────────────────────┘

┌─────────────────────────────────────────────────────────────┐
│ TRANSMIT TO A USER SMART DEVICE A HUMAN READABLE INTERFACE   │
│ COMPRISING THE POST-WELDING EVENT STATE SIGNATURE AND THE    │
│                      ALERT STATE VALUES                       │
│ 808                                                           │
└─────────────────────────────────────────────────────────────┘
```

FIG. 8

METHOD AND APPARATUS TO MONITOR A FIRE STATE ASSOCIATED WITH A WELDING EVENT

FIELD OF THE INVENTION

The present invention relates to methods and apparatus for detection of a fire state in an area proximate to welding processes involved in a welding event. In some examples, a fire state monitoring apparatus may algorithmically calculate a risk of a fire state developing. The apparatus of the present invention may communicate an alert state to users and/or remedial action apparatus.

BACKGROUND OF THE INVENTION

The activity of welding is fundamental to many types of modern construction, fabrication, and manufacturing. Control and optimization of various welding processes has been studied for many years and new technologies have been applied. For example, inspection of a formed weld may include infrared (IR) technology has been deployed to improve and define welds.

Comparison of IR images between a hot weld surface and a steady state signature may be used to analyze a performed weld. The weld analysis may be used to provide feedback to a welding professional and, in some examples, to make adjustments to a welding condition and/or settings on equipment used to perform a welding process.

It may be extremely desirable to create a system that uses IR image capture to record a welding event and quantify variables that may be used to detect a state of fire or to predict a progression towards a state of fire in the environment and in the surrounding regions and structures of the welding event.

SUMMARY OF THE INVENTION

Accordingly, the present invention combines methods and apparatus for monitoring a welding event and quantifying variables related to a fire state proximate to the welding event. These variables may be analyzed and used to detect a current state of fire or predict the progressing of a state towards fire in the environment, neighboring regions and neighboring structures. Included in the present invention are methods and apparatus for monitoring a welding event that deploys sensors proximate to a welding event, the sensors may include, for example, an IR image capture sensor to memorialize conditions related to a welding event and quantify variables that may be used to detect a state of fire proximate to the welding event or to predict a progression towards a state of fire in an environment including surrounding regions and structures of the welding event.

In the present invention, sensors, which may include IR technology, are used to detect and record a presence or absence of fire, and also to quantify and record conditions proximate to a welding event that may be indicative of a fire state or predictive of a fire state.

In some embodiments, an initial sensor reading, which may include generation of a preexisting IR signature of a structure proximate to a welding event, is made prior to the welding event. The initial sensor reading may function as a baseline from which a delta may be calculated. A delta may be set to act as an early warning technique for detection of a fire state. In some embodiments, a material type pf articles proximate to a site of a welding event may be determined and entered into a controller. A flash point for respective material types may also be entered and such that a monitoring activity may analyze whether a flashpoint is being approached.

The baseline sensor reading and designated delta generated via empirical measurements may be cyclically compared by a computing processor to provide appropriate discrimination of noise signals, wherein the noise signal may otherwise cause a false indication of a fire state. Welding is a high energy process that may generate noise type signals, however, by placing sensors, including IR monitors, at an appropriate distance and cycling sensor operation, effects of noise may be minimized during a fire status monitoring process.

In another aspect, welding conditions, such as a type of welding performed during a welding event, a material being welded, a type of material utilized to implement the weld, or other variable may be used to generate a fire status monitoring period following an end time of a welding event. For example a MIG welding event may be assigned a different fire status monitoring period than an oxy-acetylene welding event, which in turn may be assigned a different fire status monitoring period than an arc welding event.

Similarly, sensor types and placement of various sensors, as well as a frequency and duration of sensor operation cycles, may be based upon one or more of: a type of welding equipment involved in a welding event; a type of welding process engaged in; a duration of a welding event; distance, angle speed and heat ("DASH"); amperage; atmospheric conditions, humidity; surrounding materials and almost any other variable that may be instrumental of a likelihood of a fire event.

In general, methods of the present invention include defining a fire state area proximate to a welding event. The welding event includes engaging in one or more welding processes. One or more sensors are secured in respective positions proximate to a fire state area that enable each sensor to detect a physical condition of an article within the fire state area. The one or more sensors are placed in logical communication with a fire monitor controller that includes a processor and executable code stored in a digital storage. One or more of the sensors may be operated prior to the welding event to generate first sensor output values from which a pre-existing sensor state signature may be generated by the fire state controller.

The welding procedures included in the welding event are performed within or close to the fire state area. Operating the one or more sensors after the welding event may generate a post welding event sensor output signature of the article. A comparison of the pre-existing sensor state signature of the article and the post welding event sensor output signature of the article may be performed by the fire state controller.

In some embodiments, the fire state controller may be operated to designate a range of values for the one or more sensors as alert state values. The alert state values may be transmitted to a smart device via a user interface.

DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION

The present invention provides for methods and apparatus for monitoring an environment proximate to a welding event during the weld event and/or for a period of time following the welding event, in order to detect conditions conducive to a fire state indicative of a fire state, and in some embodiments to prevent a fire state.

In the following sections, detailed descriptions of examples and methods of the invention will be given. The description of both preferred and alternative examples though through are exemplary only, and it is understood that to those skilled in the art that variations, modifications and alterations may be apparent. It is therefore to be understood that the examples do not limit the broadness of the aspects of the underlying invention as defined by the claims.

Figure 1:
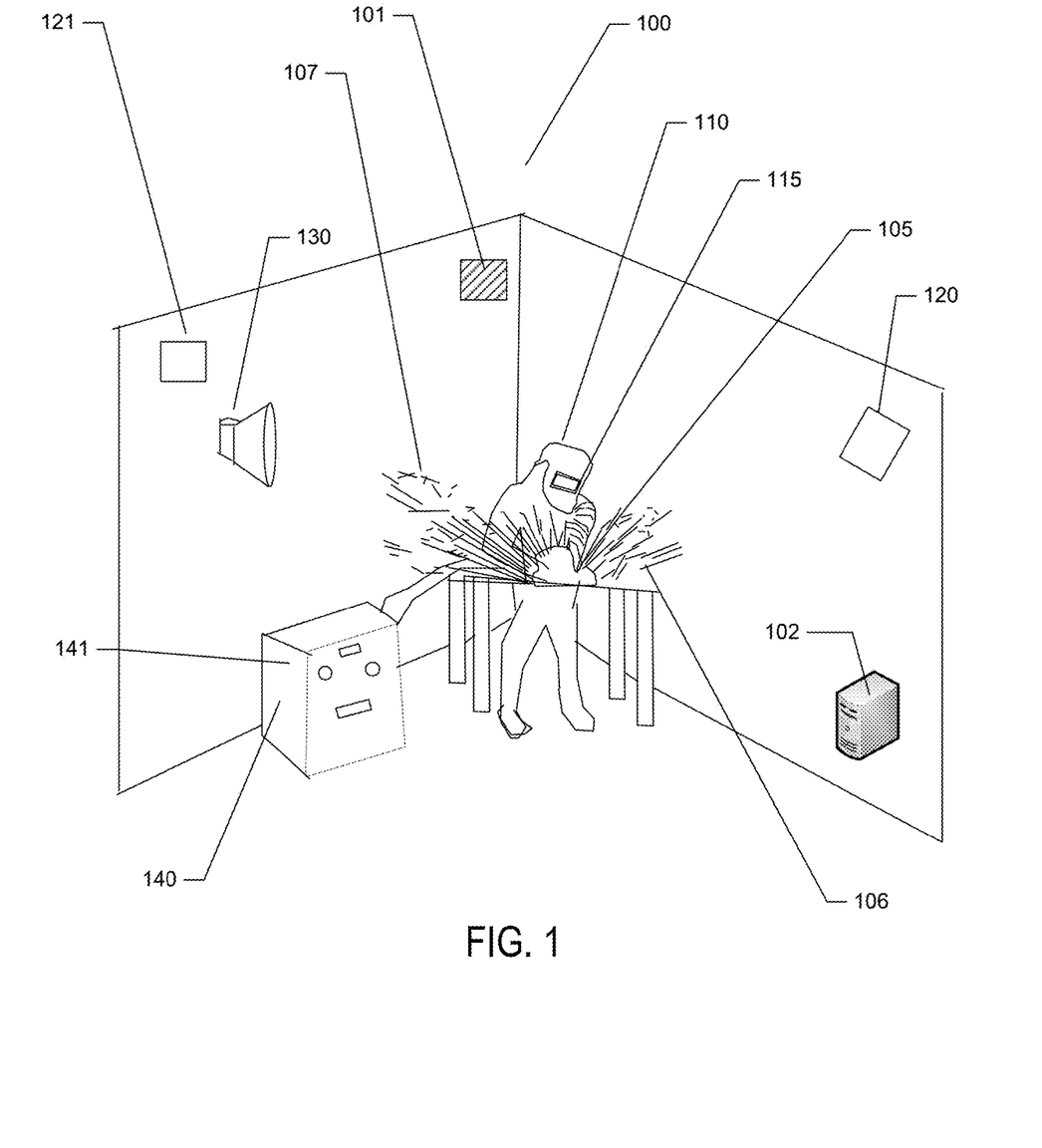
FIG. 1 illustrates welding fire detection and prevention apparatus positioned in a structure based upon a welding event.

Referring now to FIG. 1, welding event monitoring apparatus 100 and methods included in a welding event fire state detection system may include sensors 120-121, such as an IR sensor, which may be operated to quantify variable conditions proximate to the welding event. In some embodiments, a condition relative to a welding event is wirelessly located in three dimensional (3D) space proximate to a welding event. Wireless communication may include for example, Bluetooth, Wi-Fi, optical or sonic communications.

In some examples, apparatus may be placed in fixed positions in a structure, such as, in the case of a portion of a facility that is used to perform routine welding events. A dedicated detection system may include sensors and processors operated to quantify conditions within a portion of the facility and proximate areas.

In other examples, a welding event may be a transient process, such as when a portion of structure is being constructed or repaired or when an item of equipment is being installed, removed, repaired or modified via welding. A mobile detection system may also include one or more sensors temporarily fixed in respective positions during a welding event and for a prescribed period of time following the welding event where the sensors may be operated to quantify conditions relative to the detection and/or prevention of fire states.

In some examples, the detection apparatus may include, among other items, multiple IR sensors, which may be incorporated into one or more IR cameras to quantify conditions proximate to a site prior to, during, and after a welding event. An IR sensor may include an IR transmitter that transmits IR wavelength energy in conjunction with a lens that receives IR wavelength energy and directs and/or focuses the IR wavelength energy onto an IR receptor in the sensor. The sensor may be in logical communication with a processor to control the operation of the sensor and/or lens. A storage medium may store digital data indicative of an empirical quantification made by the IR sensor of a condition proximate to the welding event.

In some embodiments, an area proximate to welding site, may be monitored via operation of multiple IR cameras, or combinations of IR sensors and other sensors, such as sensors quantifying conditions based upon detection of spectral band wavelengths of energy, in order to monitor a site of a welding event.

In some examples, cameras may have filtered IR inputs to optimize detection of a fire state and/or conditions conducive to a fire state. In other examples, IR sensors may be optimized to detect or estimate a temperature of materials proximate to a welding event based on the material's IR signature. Conditions proximate to a welding event site may be input to a controller, or other processor, to perform analysis as to whether the conditions are likely to result in a fire state. Such an analysis may be used to infer a risk or danger that a temperature is being reached in the immediate area of welding or in the proximate areas that is specified as being of concern.

In some embodiments, a type of material and/or substance located in an area proximate to a welding event may be determined and input into the controller and a material specific fire state set point for the specific material and/or substance may be entered into the controller via user interaction or download from a material fire set point reference.

As a non limiting example, an IR camera such as the Smart IR cameras offered by Axton Tech™ or the XI Series IR cameras offered by Optris™ Gmbh.

In FIG. 1, an exemplary welding fire detection and prevention system 100 is illustrated with sensors 120-121, including IR wavelength cameras fixed in position proximate to a site of a welding event. A welding fire detection and prevention system controller 101 may be configured to receive data from one or more sensors 120-121, which, as discussed above may include cameras, and receive measurements quantifying a condition proximate to the one or more sensors 120-121. The measurements may be stored as digital data in a digital storage medium in logical communication with the controller 101 and/or incorporated as part of the controller 101, and method steps executed by the controller 101 may reference the measurements stored as digital data in the storage medium.

By way of non-limiting example a welding event may include a welder 110 performing a process that includes a number of welding steps 105 in the fabrication, manufacturing, repair, modification or improvement of a structure using welding components. In some examples, automated welding apparatus may perform the welding processes. In some examples, a welding location (such as the one illustrated) may be a permanent or semi-permanent area within a facility where welding is routinely practiced. In other embodiments, a site of a welding event may be temporary.

When welding steps 105 are actively being performed or have recently been performed, as part of a welding event, various results from one or more high energy processes involved in the welding event may occur. For example, sparks 106 may be generated, as well as smoke, flame, heat and the like. In some examples, heat or other by-products of a welding event may interact with the structure 107, such interaction may increase a potential for a fire event. The welder 110 may operate a welding unit 140 that includes various types of communication system elements 115 configured to allow a communication to occur during welding such as indicator lights, display screens, heads up displays, sound speakers and other such devices incorporated within the protective apparel they are wearing. Other means of communication may also be used.

The welding fire detection and prevention apparatus may 100 include elements such as infrared sensors and/or cameras 120 and 121 to monitor both the region of the weld and the surrounding area. In the illustrated example, sensors 120-121 include a pair of cameras deployed in positions that enable the sensors 120-121 to quantify one or more conditions proximate to the welding event, but in some examples numerous cameras and/or infrared sensors as well as arrays of camera elements may be employed to study the infrared and thermal signature of various locations in the area of the welding. In an example, a loud speaker 130 or other signaling device may be configured in the area for communication of alarm states. Depending on the type of welding being practiced there may be numerous examples of welding unit 140 that may be located in the area. In some examples, the welding unit 140 may include communication and control elements 141 which may receive external control signals. The external control signals may modify the welding conditions, or in some examples, may disable the welding process due to an alarm state.

As discussed above, sensors 120-121 may include infrared cameras or other sensor type capable of quantifying a condition proximate to a welding event. For example, a sensor 120-121 may include one or more of: a thermocouple capable of quantifying a temperature of a surface or an ambient atmosphere; carbon dioxide in an ambient atmosphere; particulate content in an ambient atmosphere; scattered light sensors; electrostatic sensors; sensors quantifying the visible light spectrum; particle size sensors; optical transmission sensors; or other solid state or electro mechanical device capable of quantifying a condition proximate to the welding event.

Figure 2:
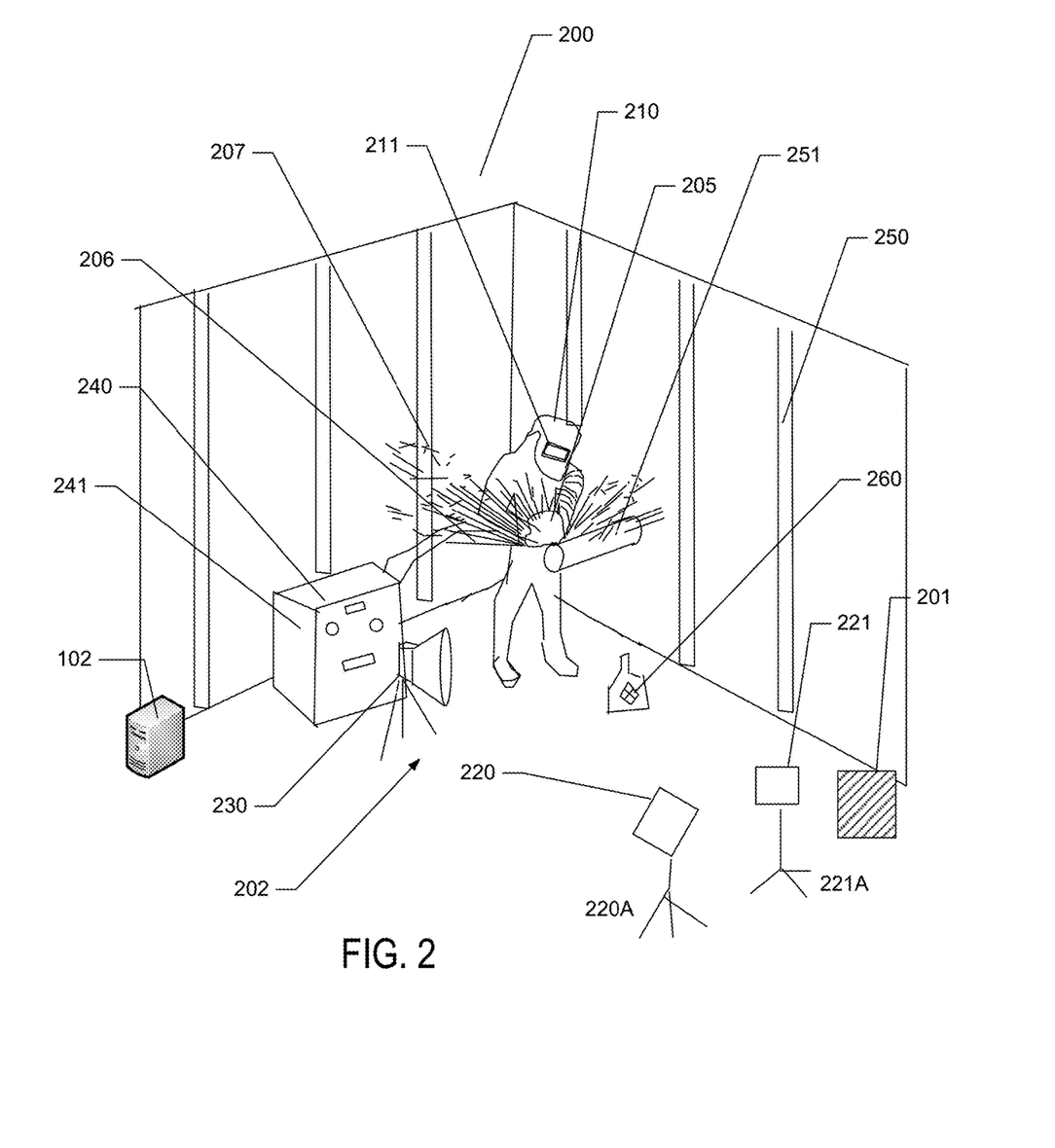
FIG. 2 illustrates mobile welding fire detection and prevention system elements.

Proceeding to FIG. 2 an exemplary mobile welding fire detection and prevention system 200 is illustrated in a transient welding location 202. As opposed to the established location illustrated in FIG. 1, in FIG. 2 a welding event is moved to an onsite welding location 202 where a process involving welding occurs, which in this specification may also be referred to as a transient welding location. In the example illustrated, a structure under construction 250 may have welding occurring during construction, repair, maintenance, improvement, addition or other event. For example, sections of piping 251 or other utility systems may have welding performed during a build phase or repair or maintenance. A user 210 may control the welding process 205 or an automated welding apparatus may perform processes. When the welding process 205 is actively being performed various results from the high energy processes involved may occur. In a non-limiting example, by-products 206 may be generated, such as, one or more of: sparks, smoke, flame, heat and the like.

In some examples, the generated by-products 206 may interact with a structure 207, which may increase a potential for a fire event. A mobile version of a welding fire detection and prevention apparatus will include a controller 201 suitable for logical communication with sensors 220-221 temporarily deployed at a welding site. The controller 201 may be configured to receive empirical quantifiers of conditions present data and process the data from a variety of sensors 220-221. Mobile versions of sensors 220-221 may include infrared sensors, cameras or camera arrays configurable on mobile bases 220A-221A and positioned in the onsite welding location 202 for the mobile welding fire detection and prevention system 200 to monitor a welding event.

Similar to the sensors 120-121 discussed above in regard to FIG. 1, mobile sensors 220-221 may include one or more of: infrared cameras; a thermocouple capable of quantifying a temperature of a surface or an ambient atmosphere; carbon dioxide in an ambient atmosphere; particulate content in an ambient atmosphere; scattered light sensors; electrostatic sensors; sensors quantifying the visible light spectrum; particle size sensors; optical transmission sensors; or other solid state or electro mechanical device capable of quantifying a condition proximate to the welding event cameras or camera arrays 220 and 221 may monitor both the region of the weld and the surrounding area. In the example illustrated, a pair of cameras are employed, but in some examples numerous cameras and/or infrared sensors as well as arrays of camera elements may be employed to study the infrared and thermal signature of various locations in an area of the welding.

A human interface device (HID) 230 may be placed in logical communication with the controller 201 and operative to provide human ascertainable to communicate alarm states to a human. HIDs 230 may include one or more of: an audible message, such as via a loud speaker; a visual signal; text; a tactile signal, such as a vibration conveyed via a piezo electric device worn by a user, a CCD display; a display worn on the head of a user, such as a visual display device affixed to a welding mask; or other solid state or electromechanical device operative to be ascertainable by a human user.

The welder or other user 210 may also have communication systems 211 affixed to or configured into his protective apparel which may have wired or wireless communication pathways established with the welding fire detection and prevention system controller 201. Depending on a type of welding being practiced, there may be numerous examples of welding equipment 240 that may be located in the area. In some examples, the welding equipment 240 may include logical communication and control elements 241 which may receive control signals from an external source, such as the controller 201. External control signals may modify the welding equipment 240 settings, or in some examples, may disable a welding process being performed by the welding equipment 240 due to an alarm state.

As mentioned previously, in some embodiments, a visual spectrum band camera may be used to observe a permanent or transient welding site. The output of a camera monitoring the site, regardless of spectral band, may be inputted to a digital processing system which may employ pattern recognition, machine learning and/or artificial intelligence techniques to recognize materials in the region proximate to the welding site that may be flammable, either in concert or not with a determination of estimated temperatures in the environment. In an example, an OSHA label 260, an NFPA label or other identification labeling may be observed and recognized by the monitoring system. In another example, a shape recognition may be performed based on a trained database of typical items present in the specific structure of observation, where the shape recognition may be used to determine the nature of an item and a flammability potential for the item. In some embodiments, a flammability potential of the item may be converted to a scaled rating. A position of an item assigned a scaled rating for flammability potential and may be combined with the scaled rating to determine a location of a sensor 220-221. For example, an item assigned a higher flammability potential may have a sensor location and position suitable for monitoring a fire state of that item.

In some examples, such a system may provide a number of signaling outputs for communicating a risk state such as an audible alarm, a visual alarm, a data communication such as text message, email, or other direct communication to a user or list of users and/or a data communication to site monitoring systems. In some examples, a welding helmet or a safety helmet may be equipped with indicator lights or displays that may be used to communicate a risk status from the system to the welder or to supervisors of a welding operation. In some examples, a risk state may trigger the disablement of welding equipment in the environment. Any manner of communicating alarm or warning information may be used with the system.

In some examples, a monitoring system may include a user interface where scheduling information may be entered. The scheduling information may include date and time information and may also include location information which may allow optimization of monitoring. For example, a region of a facility may have a fire detection monitoring system with various operational setpoints that discriminate when a welding process is occurring in the area of monitoring. Thus, settings may be appropriate when welding is occurring and may be altered when welding is not occurring, where such alteration may optimize both detection and the elimination of false positive or false negative detections. The use may also enter more detailed information relating to the welding event that may further be used to optimize settings of the system such as whether the welding will involve: oxyacetylene, arc welding, MIG welding, TIG welding; spot welding; and the like. A database may contain standard characteristics for such a system such as aspects about sparks generated, typical flame lengths, through slag aspects or the like; or, alternatively a user may input specific information about the anticipated aspects based on the particular welding job to be performed.

In some examples, a welding system performance may be characterized for numerous types of welding jobs while being monitored by the monitoring system. Thereafter, the performance of the welding system for such an exemplary job may be monitored and results out of the normal range for the system may be flagged as increased risk situations. For example, observed temperature gradients of a region before during or after a welding event may be estimated and monitored by the system. The resulting observations may be used to infer risks related to ignition likelihood. As mentioned before, in some examples, a combination of temperature observations along with an inferred nature of materials in the environment may be used to calculate risks. In some examples, warnings may be given to users of welding equipment and/or to supervisors of a job site, in other examples risk elevation states may trigger deactivation or other state changes of the welding equipment. In still further examples, a risk state, perhaps indicative of an active fire state may trigger fire suppression systems in the area even before the suppression systems triggering elements are activated.

The system may maintain an elevated state of monitoring for a period after welding has been completed both to observe reduction in observed temperatures in the environment and to observe the lack of evolution of a heating or fire signal in the environment that may relate to a smoldering process of heat with materials.

In a similar manner, the data processing system may include a modelling algorithm which may utilize an input of the type of welding to simulate expectable durations of elevated heating events and the concomitant levels of temperature increase in the area of the welding that may be anticipated. In some examples a dynamic model may interact with a user to provide communications relating to anticipated risk and/or risk factors in the environment of the welding process such as detections of materials.

The welding fire detection and avoidance system may interact with a structural modelling system such as an augmented virtual model (AVM) of the structure which may include its own dynamic and active monitoring systems. The welding and fire detection and avoidance system may provide sensor and analysis data to a building's AVM system, or in other examples, it may make its own query of sensor data maintained in the AVM system to perform analysis.

In an example, a building's AVM system may include various gas monitoring systems as part of its routine monitoring. The presence of carbon monoxide or carbon dioxide may be used in supplementing risk assessments of a fire state. In a different sense, the presence of a flammable gas may also provide an alteration of analysis of risk factors relating to welding. An increase in a flammable gas in the area of a welding operation under monitoring may trigger a warning to be communicated or in other examples, may trigger an action to be taken such as the suspension of the operation of the welding equipment or of the power provided to a welding system.

A building's AVM system may provide monitoring of measurable parameters throughout the structure. For example, temperature may be measured in a room neighboring a welding operation. Therefore, a temperature rise in a wall or a panel of some kind may be transferred to a room outside of the range of the direct viewing area of the IR camera. However, there may be materials or aspects of the area on the other side of the wall that may create a different risk assessment for an algorithm associated with the welding fire detection and avoidance system. In some examples, communication between the AVM and the welding fire detection and avoidance system may allow for characterization of risk elements on the other side of walls, or through ducting systems of the structure that may increase the utility of warnings from the system, which may improve safety factors. The AVM may provide dynamic data inputs that may also trigger warning states such as a rise in temperature of a duct work or of a neighboring space to a welding operation. Alternatively, a safe level of temperature rise in a neighboring area to welding or in ductwork or other utilities as examples that may otherwise be viewed as aberrant by AVM monitoring systems may be identified by a welding fire detection and avoidance system.

In some examples, the welding fire detection and avoidance system may monitor multiple sites at a time or multiple users. A user may enter a user id to the system, or the system may read an identification badge of an employee or other identifying feature, or a biometric assessment such as facial recognition may be performed to identify a particular welder. The system may then be able to associate characteristic data related to each user of the system. In some examples, such recordation of data may allow for the improvement in safety procedures and training/retraining of employees. The nature of fire prevention processes that are deployed either for a particular user and/or for a particular type of welder or for a particular welder itself may be tracked. In some example, preventative maintenance aspects may be linked and driven by dynamic measurements of the equipment.

In some examples, the IR Detection systems of the welding fire detection and prevention system may be employed for multiple purposes such as the additional use of monitoring the quality of welds with the equipment. In some examples, characteristics of the procedures used during a welding process as well as the environmental measurements monitored during the welding process may be coupled with an assessment of weld quality made by the IR systems to improve safety and fire aspects as well as improving quality aspects.

Figure 3:
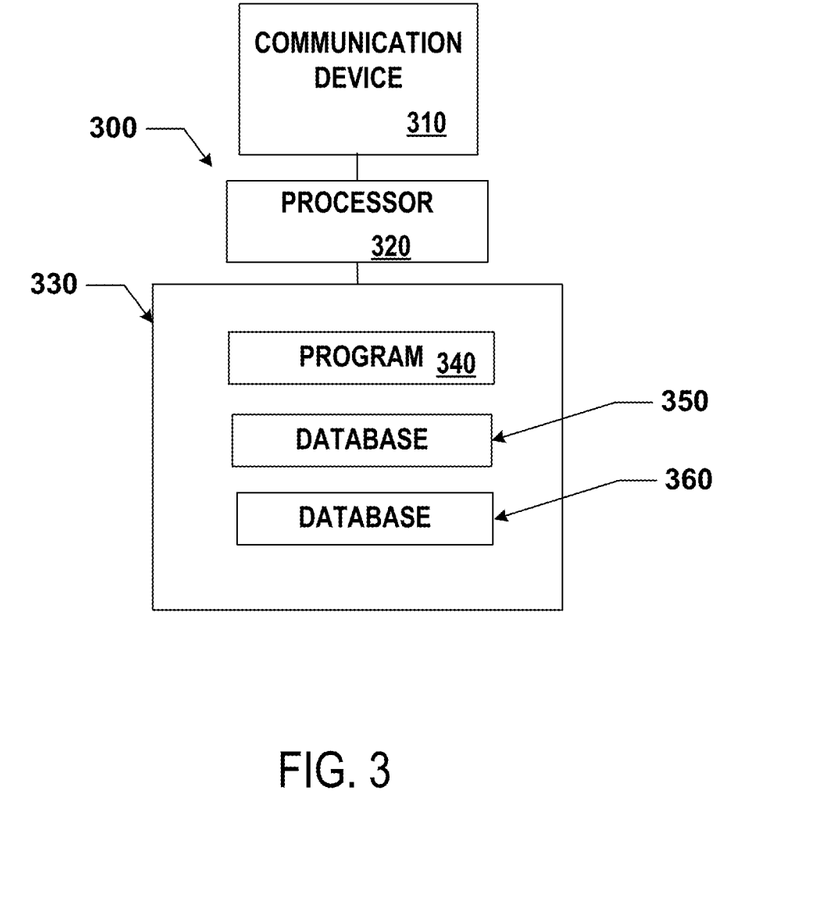
FIG. 3 illustrates apparatus that may be used to implement aspects of the present invention including executable software.

Proceeding to FIG. 3, an exemplary data processing system that may be used herein is illustrated. An automated controller may be used to implement various aspects of the present invention, in various embodiments, and for various aspects of the present invention, controller 300 may be included in one or more of: a wireless tablet or handheld device, a server, a rack mounted processor unit. The controller may be included in one or more of the apparatus described above, such as a Server, and a Network Access Device. The controller 300 includes a processor unit 320, such as one or more semiconductor based processors, coupled to a communication device 310 configured to communicate via a communication network (not shown in FIG. 3). The communication device 310 may be used to communicate, for example, with one or more online devices, such as a personal computer, laptop, or a handheld device.

The processor 320 is also in communication with a storage device 330. The storage device 330 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 330 can store a software program 340 with executable logic for controlling the processor 320. The processor 320 performs instructions of the software program 340, and thereby operates in accordance with the present invention. The processor 320 may also cause the communication device 310 to transmit information, including, in some instances, control commands to operate apparatus to implement the processes described above. The storage device 330 can additionally store related data in a database 350 and database 360, as needed.

Figure 4:
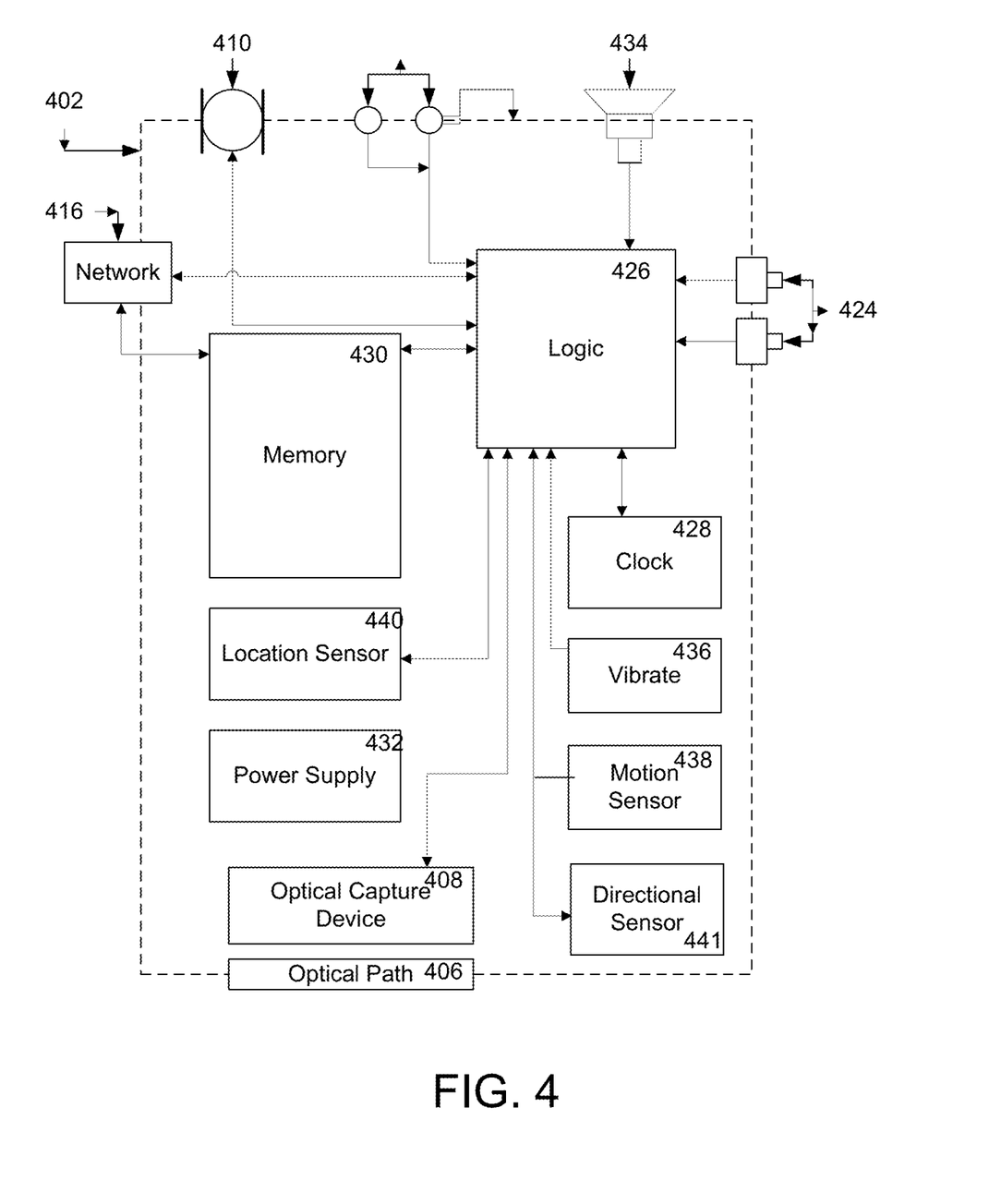
FIG. 4 illustrates an exemplary mobile smart device that may be used to implement aspects of the present invention including executable software.

Referring now to FIG. 4, a block diagram of an exemplary mobile device 402. The mobile device 402 comprises an optical capture device 408 to capture an image and convert it to machine-compatible data, and an optical path 406, typically a lens, an aperture or an image conduit to convey the image from the rendered document to the optical capture device 408. The optical capture device 408 may incorporate a Charge-Coupled Device (CCD), a Complementary Metal Oxide Semiconductor (CMOS) imaging device, or an optical Sensor 424 of another type.

A microphone 410 and associated circuitry may convert the sound of the environment, including spoken words, into machine-compatible signals. Input facilities may exist in the form of buttons, scroll wheels, or other tactile Sensors such as touch-pads. In some embodiments, input facilities may include a touchscreen display.

Visual feedback to the user is possible through a visual display, touchscreen display, or indicator lights. Audible feedback 434 may come from a loudspeaker or other audio transducer. Tactile feedback may come from a vibrate module 436.

A motion Sensor 438 and associated circuitry convert the motion of the mobile device 402 into machine-compatible signals. The motion Sensor 438 may comprise an accelerometer that may be used to sense measurable physical acceleration, orientation, vibration, and other movements. In some embodiments, motion Sensor 438 may include a gyroscope or other device to sense different motions.

A location Sensor 440 and associated circuitry may be used to determine the location of the device. The location Sensor 440 may detect Global Position System (GPS) radio signals from satellites or may also use assisted GPS where the mobile device may use a cellular network to decrease the time necessary to determine location. In some embodiments, the location Sensor 440 may use radio waves to determine the distance from known radio sources such as cellular towers to determine the location of the mobile device 402. In some embodiments these radio signals may be used in addition to GPS.

The mobile device 402 comprises logic 426 to interact with the various other components, possibly processing the received signals into different formats and/or interpretations. Logic 426 may be operable to read and write data and program instructions stored in associated storage or memory 430 such as RAM, ROM, flash, or other suitable memory. It may read a time signal from the clock unit 428. In some embodiments, the mobile device 402 may have an on-board power supply 432. In other embodiments, the mobile device 402 may be powered from a tethered connection to another device, such as a Universal Serial Bus (USB) connection.

The mobile device 402 also includes a network interface 416 to communicate data to a network and/or an associated computing device. Network interface 416 may provide two-way data communication. For example, network interface 416 may operate according to the internet protocol. As another example, network interface 416 may be a local area network (LAN) card allowing a data communication connection to a compatible LAN. As another example, network interface 416 may be a cellular antenna and associated circuitry which may allow the mobile device to communicate over standard wireless data communication networks. In some implementations, network interface 416 may include a Universal Serial Bus (USB) to supply power or transmit data. In some embodiments other wireless links may also be implemented.

As an example of one use of mobile device 402, a reader may scan some coded information from a location marker in a facility with the mobile device 402. The coded information may include for example a hash code, bar code, RFID or other data storage device. In some embodiments, the scan may include a bit-mapped image via the optical capture device 408. Logic 426 causes the bit-mapped image to be stored in memory 430 with an associated time-stamp read from the clock unit 428. Logic 426 may also perform optical character recognition (OCR) or other post-scan processing on the bit-mapped image to convert it to text. Logic 426 may optionally extract a signature from the image, for example by performing a convolution-like process to locate repeating occurrences of characters, symbols or objects, and determine the distance or number of other characters, symbols, or objects between these repeated elements. The reader may then upload the bit-mapped image (or text or other signature, if post-scan processing has been performed by logic 426) to an associated computer via network interface 416.

As an example of another use of mobile device 402, a reader may capture some text from an article as an audio file by using microphone 410 as an acoustic capture port. Logic 426 causes audio file to be stored in memory 430. Logic 426 may also perform voice recognition or other post-scan processing on the audio file to convert it to text. As above, the reader may then upload the audio file (or text produced by post-scan processing performed by logic 426) to an associated computer via network interface 416.

A directional sensor 441 may also be incorporated into the mobile device 402. The directional device may be a compass and be based upon a magnetic reading or based upon network settings.

Various components within the welding fire detection and suppression system may communicate digital data to and from a smart device such as described herein.

METHODS

Figure 5:
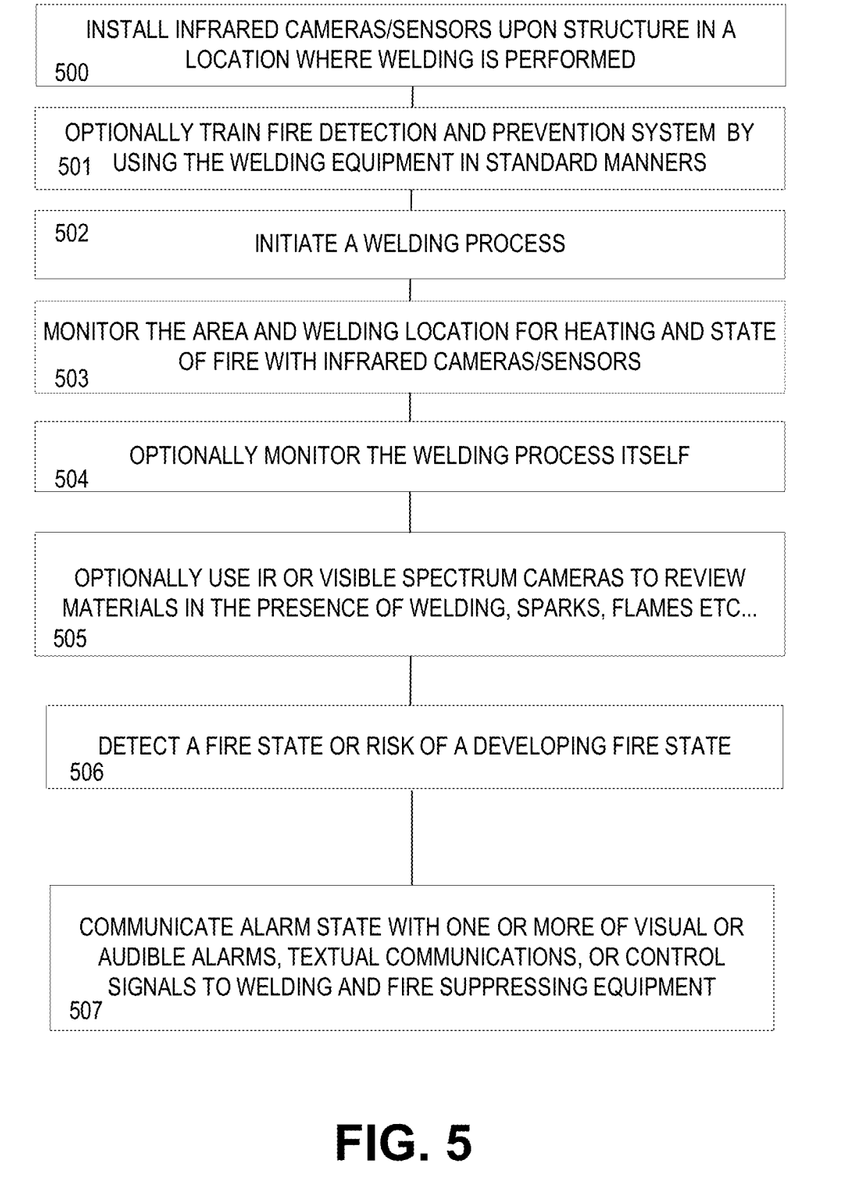
FIG. 5 illustrates exemplary methodology for structurally positioned welding event related fire detection and prevention system elements.

The methods shown in FIGS. 5-8 generally relate to monitoring a welding event for a fire state proximate to a predefined welding area. The fire state area may be a spatial region proximate to the welding area, or any subset thereof with a proclivity for flammability. A welding event may be one or more welding processes. Referring now to FIG. 5, exemplary methodology for structurally mounted welding fire detection and prevention system elements are illustrated. In a first step 500, a sensing system which may include infrared cameras, infrared sensors, arrays of infrared detectors and the like may be installed up the building structure in a permanent or semi-permanent location where welding is routinely practiced. In some examples, in step 501, the sensing system may optionally be trained by using the welding system in a variety of exemplary manners to establish the routing sensing signals that are received during normal welding states. At step 502, a user may initiate a welding process. The welding fire detection and prevention system may automatically monitor the area of the welding and the welding site itself and determine various aspects about the area such as temperature and fire status at step 503. In some examples, the infrared sensing system may also inspect the welding process itself at step 504. Continuing to step 505, in another optional step cameras either IR or visual band or both may be used to recognize the presence of flammable materials in the neighborhood of the welding process. The welding fire detection and prevention system may take a variety of inputs such as have been described herein with reference to the IR sensors and cameras amongst other inputs and detect a fire state or a risk of a developing fire state at step 506. At step 507, the welding fire detection and prevention system may communicate an alarm state. There may be numerous manners of communication. In some examples, one or more of visual or audible alarms may sound in the environment of the welding process. In some other examples, communication may be made to devices on the protective apparel or helmet of a welder. The welding may be performed by automatic apparatus and the alarm condition may trigger signals that modify or disable the welding equipment depending on the risk levels detected. Such signaling may also be done with manned welding activities.

Figure 6:
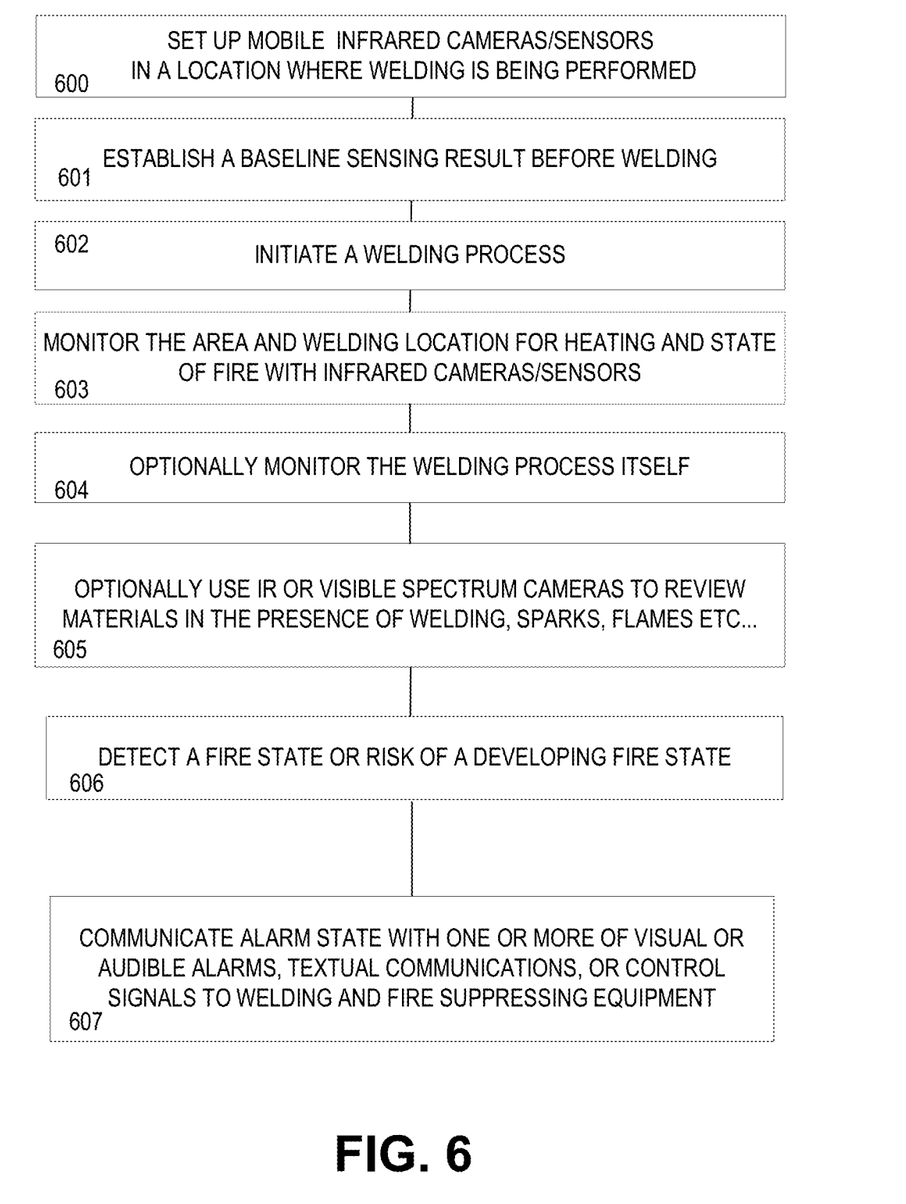
FIG. 6 illustrates exemplary methodology for mobile welding event related fire detection and prevention system elements.

Proceeding to FIG. 6, exemplary methodology for mobile welding fire detection and prevention system elements are illustrated. In a first step 600, a sensing system which may include infrared cameras, infrared sensors, arrays of infrared detectors and the like may be set up on mobile support platforms in a location where welding is to be moved to. In some examples, in step 601, the sensing system may operate before welding commences in order to establish a baseline for the sensing system. At step 602, a user may initiate a welding process. The welding fire detection and prevention system may automatically monitor the area of the welding and the welding site itself and determine various aspects about the area such as temperature and fire status at step 603. In some examples, the infrared sensing system may also inspect the welding process itself at step 604. Continuing to step 605, in another optional step cameras either IR or visual band or both may be used to recognize the presence of flammable materials in the neighborhood of the welding process. The welding fire detection and prevention system may take a variety of inputs such as have been described herein with reference to the IR sensors and cameras amongst other inputs and detect a fire state or a risk of a developing fire state at step 606. At step 607, the welding fire detection and prevention system may communicate an alarm state. There may be numerous manners of communication. In some examples, one or more of visual or audible alarms may sound in the environment of the welding process. In some other examples, communication may be made to devices on the protective apparel or helmet of a welder. The welding may be performed by automatic apparatus and the alarm condition may trigger signals that modify or disable the welding equipment depending on the risk levels detected. Such signaling may also be done with manned welding activities.

Figure 7:
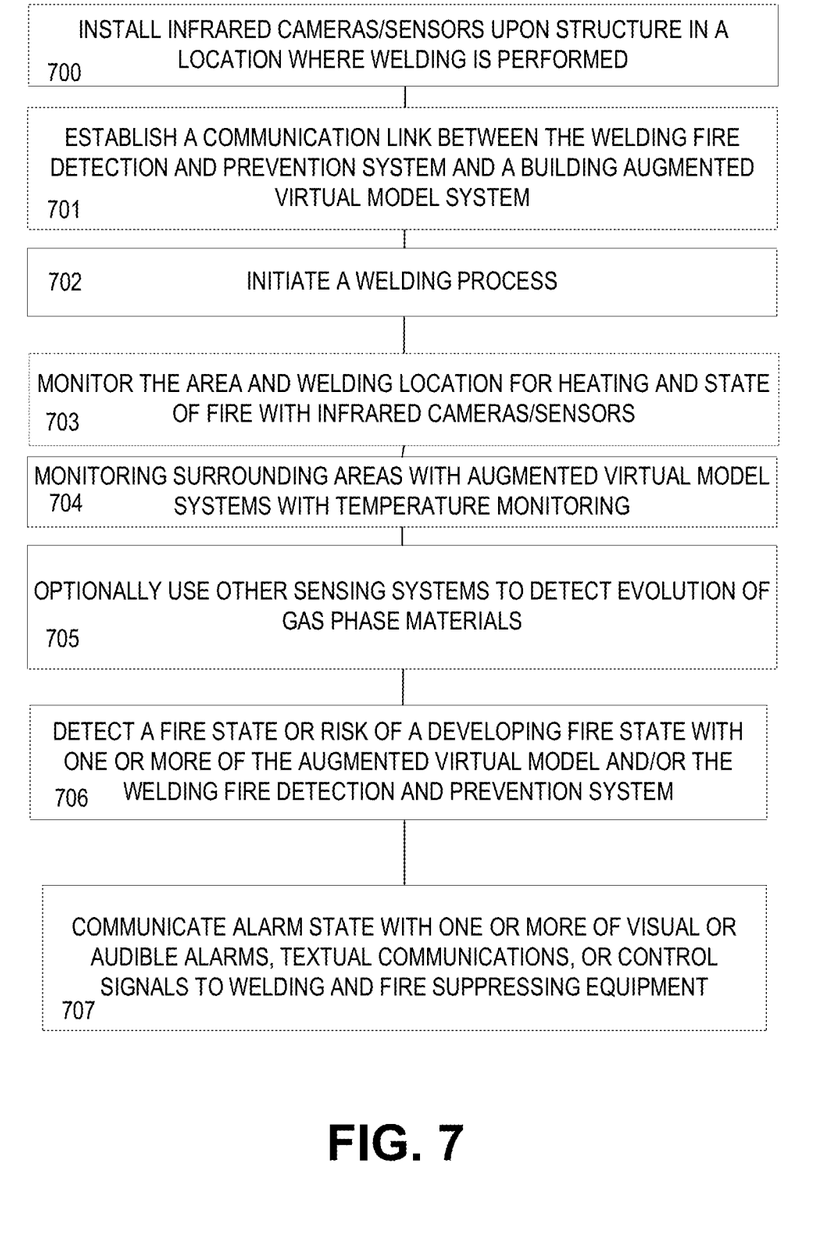
FIG. 7 illustrates exemplary methodology for interconnected welding fire event detection and prevention system elements with structural augmented virtual model systems.

Referring now to FIG. 7, exemplary methodology for interconnected welding fire detection and prevention system elements with structural augmented virtual model systems are illustrated. In a first step 700, a sensing system which may include infrared cameras, infrared sensors, arrays of infrared detectors and the like may be installed up the building structure in a permanent or semi-permanent location where welding is routinely practiced. In some examples, in step 701, a communication link may be established between the welding fire detection and prevention system and a building augmented virtual model system. At step 702, a user may initiate a welding process. The welding fire detection and prevention system may automatically monitor the area of the welding and the welding site itself and determine various aspects about the area such as temperature and fire status at step 703. In some examples, the surrounding areas may be monitored with the augmented virtual model system utilizing temperature monitoring at step 704. Continuing to step 705, in an optional step sensing systems may be used to detect evolution of gas phase materials in the environment of the welding. The evolution of certain gaseous chemicals may be indicative of fire states or risk of fire states. The welding fire detection and prevention system may take a variety of inputs from either itself or the augmented virtual model system such as have been described herein with reference to the IR sensors and cameras amongst other inputs and detect a fire state or a risk of a developing fire state at step 706. At step 707, the welding fire detection and prevention system may communicate an alarm state. There may be numerous manners of communication. In some examples, one or more of visual or audible alarms may sound in the environment of the welding process. In some other examples, communication may be made to devices on the protective apparel or helmet of a welder. The welding may be performed by automatic apparatus and the alarm condition may trigger signals that modify or disable the welding equipment depending on the risk levels detected. Such signaling may also be done with manned welding activities.

Figure 8:
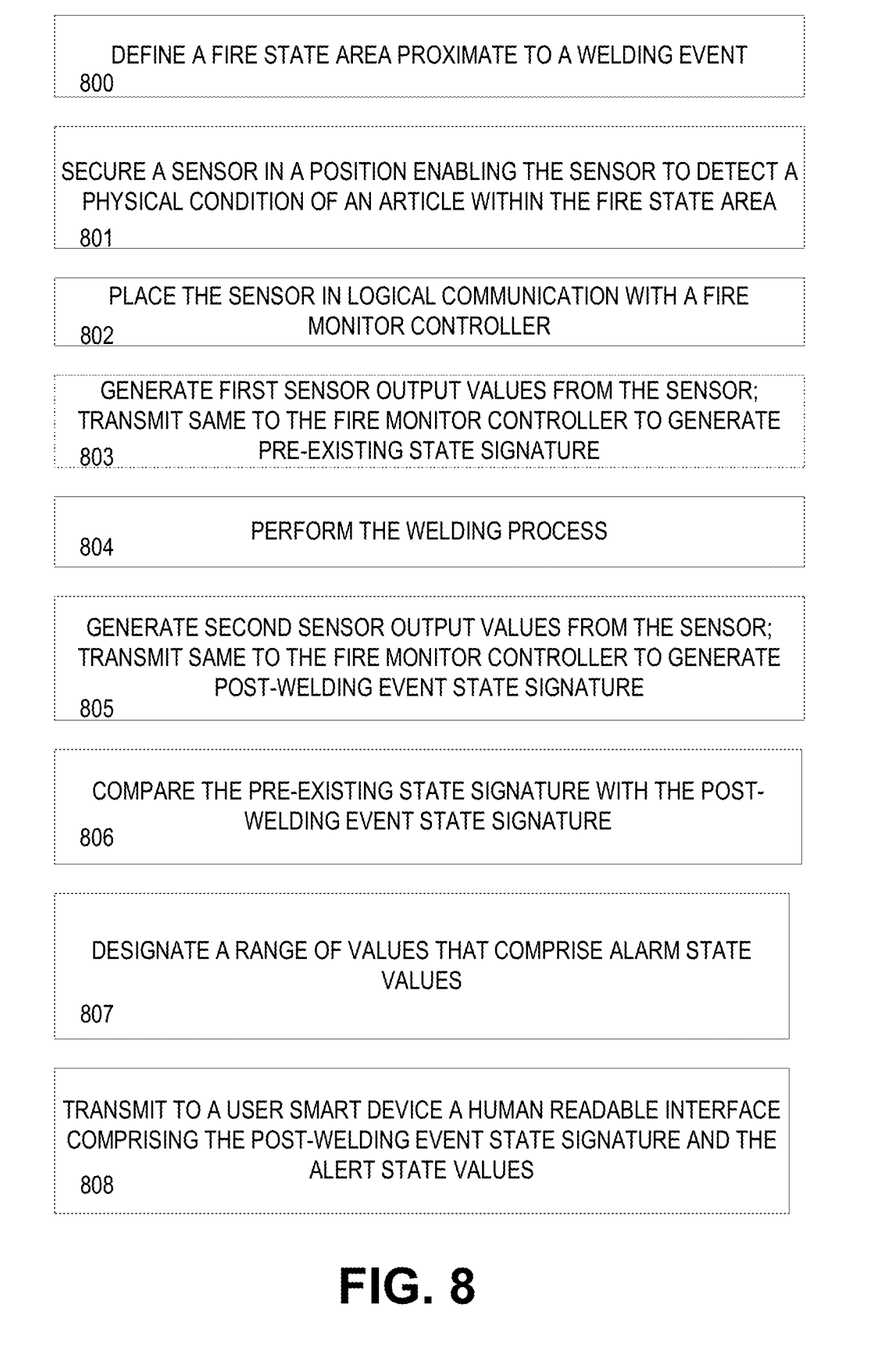
FIG. 8 illustrates an exemplary, broader method for monitoring a welding event for a fire state proximate to a welding event.

Referring now to FIG. 8, an exemplary, broader method for monitoring a welding event for a fire state proximate to a welding event is shown. At step 800, a fire state area is defined proximate to a welding event. A fire state area may be any area in which the welding event presents a heightened risk of combustion to any article within the area. A welding event may be one or more welding processes. The fire state area may then be monitored as discussed below for fire states.

At step 801, one or more sensors are secured in such a position that the sensors can detect a physical condition of an article within the fire state area. For example, an infrared camera may be focused on a flammable article to detect increased signs of heat that might suggest that the article is in danger of catching on fire. As another example, a thermocouple capable of quantifying a temperature of a surface or an ambient atmosphere, carbon dioxide detectors, mass spectrometers, particulate content sensors, light sensors, electrostatic sensors, optical transmission sensors, or other devices may be employed to sense fire state conditions. At step 802, the sensor is placed in logical communication with a fire monitor controller. An exemplary embodiment of a fire monitor controller is discussed in FIG. 4. In some embodiments, the fire monitor controller may be in logical communication with a communications network capable of transmitting according to a protocol, such as WiFi. The fire monitor controller may comprise a processor and executable code stored in a digital storage.

At step 803, the sensor generates first sensor output values from the sensor that are then transmitted to the fire monitor controller to generate a pre-existing state signature. This may give the fire monitor controller a baseline from which to assess whether fire state conditions are present. For example, the first sensor output values may be a "normal" level of carbon dioxide within the fire state area or a typical range of temperatures values for the fire state area. As another example, if the sensor is an infrared camera, then the first sensor output values may be infrared sensor values indicative of a temperature of the article. Similarly, the first sensor output values may comprise a visible light CCD camera image, and image recognition may be performed to assess the presence of a fire within the fire state area.

At step 804, the welding process is performed. As discussed in greater detail above, the nature of the welding process may inform the type and number of sensors to be deployed. For example, different sensors may be desirable for oxyacetylene welding than for TIG welding. Certain types of welding may interfere with certain types of sensors.

After (and, in some embodiments, during) the welding process concludes, at step 805, second sensor output values are generated from the sensor and transmitted to the fire monitor controller to generate a post-welding event state signature. (In embodiments in which additional sensor output values are generated during the welding process, these values may lead to the creation of an in-process sensor state signature.) Then at step 806, the post-welding event state signature may be compared with the pre-existing state signature to assess the impact on the sensor values created by the welding process at step 804. At step 807, which may occur at any point, a range of values are designated that comprise alarm state values. For example, this may be temperature exceeding a certain value (which may be determined with reference to, for example, a flashpoint associated with an article in the fire state area).

At step 808, the fire monitor controller may transmit to a user smart device a human-readable interface comprising the post-welding event state signature and the alert state values. In some embodiments, this only occurs if the post-welding event state signature exceeds the alert state values. The fire monitor controller may be operable to cause an audible alarm to sound on the user smart device. If applicable, the fire monitor controller may also transmit the in-process state signature. This may allow, in some embodiments, for transmission to the user interface of a display of the change in temperature (i.e., showing the temperature rising or falling). In some embodiments, the fire monitor controller may also transmit additional alarm conditions to the user, such as a condition indicating that a fire is imminent or in process. This may be determined by assessing whether the in-process or post-welding event state signatures exceed additional thresholds. For example, if a monitored article has a flashpoint of 500° F., then an alert may be generated when the temperature measured on the article (using, for example, thermocouples) reaches 300° F. (alert), 490° F. (fire imminent), and 600° F. (fire in progress). The foregoing numbers are meant to be non-limiting examples.

In addition to the alerts, the fire monitor controller may be operative to transmit to a remedial action device a remedial action trigger that causes the remedial action device to perform some remedial action. For example, on detecting a fire, the fire monitor controller may cause a sprinkler to activate. Alternatively, the fire monitor controller may cause an inert gas dispenser to dispense or cause a foam dispenser to dispense foam (especially if the fire state area is one with electronics).

In some embodiments, where an article is being monitored, information about the article (such as temperature) may be transmitted to a database and correlated with a record of a fire state or an absence of a fire state. This may allow for better study of the relevant environments to better predict imminent fire states.

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed invention.

What is claimed is:

1. A method for monitoring a welding event for a fire state proximate to the welding event, the method comprising the steps of:
   a) defining a fire state area proximate to a welding event, said welding event comprising engaging in one or more welding processes;
   b) securing one or more sensors in respective positions enabling each sensor to detect a physical condition of an article within the fire state area;
   c) placing the one or more sensors in logical communication with a fire state controller comprising a processor and executable code stored in a digital storage;
   d) operating the one or more sensors prior to the welding event to generate first sensor output values;
   e) transmitting the first sensor output values to the fire state controller;
   f) generating, via operation of the fire state controller, a pre-existing sensor state signature of the article within the fire state area, said pre-existing sensor state signature comprising the first sensor output values;
   g) inputting a type of welding procedure associated with the one or more welding procedures;
   h) receiving into the fire state controller a baseline temperature associated with the type of welding procedure;
   i) performing the one or more welding procedures comprising the welding event within the fire state area;
   j) operating the one or more sensors after the welding event to generate a post welding event sensor output signature of the article;

k) transmitting the post welding event sensor output values to the fire state controller;

l) generating, via operation of the fire state controller, a comparison of the pre-existing sensor state signature of the article and the post welding event sensor output signature of the article;

m) in the fire state controller, designating a range of values for the one or more sensors as alert state values, said range of values each greater than the first sensor output values, wherein the alert state values are based upon one or more of a flashpoint of a material exposed to the one or more welding procedures and the baseline temperature; and n) transmitting to a user smart device, a human readable interface comprising the post welding event sensor output signature and the alert state values.

2. The method of claim 1, additionally comprising the steps of: during the performing of the one or more welding procedures, operating the one or more sensors to generate second sensor output values; transmitting second sensor output values to the fire state controller, and generating, via operation of the fire state controller, an in process sensor state signature.

3. The method of claim 2 additionally comprising the step of transmitting to the user smart device, in the human readable interface, the in process sensor state signature.

4. The method of claim 1 additionally comprising the step of transmitting to the user smart device an alarm condition indicating an imminent fire state within the fire state area.

5. The method of claim 1 additionally comprising the step of transmitting, to the user smart device, an alarm condition indicating an in process fir state within the fir state area.

6. The method of claim 5, wherein the first sensor output values comprise an infrared sensor value indicative of a temperature of the article.

7. The method of claim 5, wherein the first sensor output values comprise a visible light charge-coupled device camera image and the method further comprises the step of performing image recognition with the fire state controller to determine a presence of fire within the fire state area.

8. The method of claim 5 additionally comprising the steps of: transmitting, to a remedial action device, a remedial action trigger; and operating the remedial action device based upon the remedial action trigger.

9. The method of claim 8 wherein the remedial action device comprises a sprinkler, and the method additionally comprises the step of dispensing water onto the fire state area.

10. The method of claim 8 wherein the remedial action device comprises an inert gas dispenser and the method additionally comprises the step of dispensing inert gas into the fire state area.

11. The method of claim 8 additionally comprising the step of entering into the fire state controller a material comprising the article within the fire state area and designating a flashpoint with the material comprising the article.

12. The method of claim 11 additionally comprising the steps of, with the fires state controller comparing a temperature quantified by the post welding event sensor output values to the flash point temperature of the article within the fire state area; and transmitting a fire state alert based upon the comparison of the temperature quantified by the post welding event sensor output values and the flash point temperature of the article within the fire state area.

13. The method of claim 11, additionally comprising the steps of: with the sensors and the fire state controller, tracking a rising temperature of the article during or after the welding event; and transmit a user interface to the user smart device indicating a rising temperature of the article.

14. The method of claim 13 additionally comprising the step of, with the sensors and the fire state controller, tracking a falling temperature of the article after the welding event; and transmit a user interface to the user smart device indicating a falling temperature of the article.

15. The method of claim 14 additionally comprising the steps of: storing in a fire state database a record of a temperature of the material of the article and a record of a fire state or absence of a fire state, and updating the baseline temperature based upon the record of a temperature of the material of the article.

16. Apparatus for monitoring a welding event for a fire state proximate to the welding event, the apparatus comprising:
a sensor affixed to a position that enables the sensor to detect a physical condition associated with an article;
a controller in logical connection with the sensor;
a processor and memory, wherein the memory comprises software executable on command to:
define a fire state area proximate to a welding event, said welding event comprising engaging in one or more welding processes;
secure the sensor in a position that enables the sensor to detect a physical condition associated with the sensor within the fire state area;
receive from the sensor first sensor output values prior to the welding event;
receive a baseline temperature associated with the welding event, wherein the baseline temperature is based upon a type associated with the welding event;
generate a pre-existing sensor state signature of the article, wherein the pre-existing sensor state signature comprises the first sensor output values;
receive from the sensor second sensor output values after the welding event;
generate a post-welding event sensor state signature of the article, wherein the post-welding event sensor state signature comprises the second sensor output values;
generate a comparison of the pre-existing sensor state signature with the post-welding event sensor state signature;
designate a range of values for the sensors as alert state values, wherein the range of values differs from the first sensor output values; and
transmit to a user smart device a human-readable interface comprising the post-welding event sensor state signature and the alert state values.

17. The apparatus of claim 16, wherein the software is further operable to transmit an alarm condition indicating an imminent fire state within an area associated with the fire state.

18. The apparatus of claim 16, wherein the software is further operable to transmit, to a remedial action device, a remedial action trigger.

19. The apparatus of claim 18, wherein the remedial action device comprises a sprinkler.

20. The apparatus of claim 16, wherein the memory also comprises a database correlating a material associated with the article with a flashpoint.

* * * * *